United States Patent
Ramabhadran et al.

(10) Patent No.: US 7,274,575 B2
(45) Date of Patent: Sep. 25, 2007

(54) AC COUPLED BIAS CIRCUIT FOR POWER CONVERTERS

(75) Inventors: Ramanujam Ramabhadran, Waltham, MA (US); David A. Williams, Andover, MA (US)

(73) Assignee: Power-One, Inc., Camarillo, CA (US)

( * ) Notice: Subject to any disclaimer, the term of this patent is extended or adjusted under 35 U.S.C. 154(b) by 75 days.

(21) Appl. No.: 11/198,601

(22) Filed: Aug. 5, 2005

(65) Prior Publication Data
US 2007/0030704 A1  Feb. 8, 2007

(51) Int. Cl.
*H02M 3/335* (2006.01)
*H02M 5/42* (2006.01)

(52) U.S. Cl. ........................ 363/21.1; 363/97

(58) Field of Classification Search .. 363/21.01–21.18, 363/26, 56.12, 97
See application file for complete search history.

(56) References Cited

U.S. PATENT DOCUMENTS

| | | | | |
|---|---|---|---|---|
| 5,363,287 A | * | 11/1994 | Liu et al. ...................... | 363/20 |
| 5,559,683 A | * | 9/1996 | Schoenwald ............. | 363/21.17 |
| 5,661,642 A | * | 8/1997 | Shimashita ............... | 363/21.15 |
| 6,466,461 B2 | | 10/2002 | Mao et al. | |
| 6,510,062 B2 | * | 1/2003 | Goder et al. ............. | 363/21.11 |
| 6,542,388 B2 | * | 4/2003 | Amei ....................... | 363/56.01 |
| 6,577,510 B1 | * | 6/2003 | Yasumura ................ | 363/21.02 |
| 6,646,895 B1 | * | 11/2003 | Jacobs et al. ............ | 363/21.08 |
| 6,693,812 B1 | * | 2/2004 | Li et al. ........................ | 363/97 |
| 6,987,677 B2 | * | 1/2006 | Konno ......................... | 363/49 |
| 7,139,179 B2 | * | 11/2006 | Hua ............................. | 363/89 |

* cited by examiner

*Primary Examiner*—Gary L. Laxton
*Assistant Examiner*—Harry Behm
(74) *Attorney, Agent, or Firm*—Robert D. Atkins; Quarles & Brady LLP

(57) ABSTRACT

A switching power system for converting an input voltage to an output voltage across a transformer is disclosed. The system includes a control circuit. The control circuit has a control input coupled for receiving the output voltage and an output coupled to a primary winding of the transformer. The system includes a bias circuit for supplying an operating voltage to the control circuit. The bias circuit includes a capacitor. The capacitor has a first terminal coupled to a first terminal of a first secondary winding of the transformer. A first diode is coupled between a second terminal of the first secondary winding and a second terminal of the first capacitor. A second diode is coupled between the second terminal of the capacitor and a bias input of the control circuit. A method of making the same is disclosed.

1 Claim, 5 Drawing Sheets

| | DUTY CYCLE | FORWARD VOLTAGE NS1 | FORWARD VOLTAGE NS2 | FLYBACK VOLTAGE NS1 | FLYBACK VOLTAGE NS2 | PEAK VOLTAGE ACROSS Ca (ADD FLYBACK NS1 TO FLYBACK NS2) | VOLTAGE AT Cc |
|---|---|---|---|---|---|---|---|
| 36 $V_{IN}$ | 55.6% | +9V | -6V | -11.27 | +7.51 | +18.8 | 10.3 |
| 48 $V_{IN}$ | 41.7% | 12V | -8V | -8.58 | +5.72 | +14.3 | 11.3 |
| 60 $V_{IN}$ | 33.3% | +15V | -10V | -7.49 | +4.99 | +12.48 | 12.8 |
| 72 $V_{IN}$ | 26.7% | +18V | -12V | -6.56 | +4.37 | +10.93 | 14.5 |

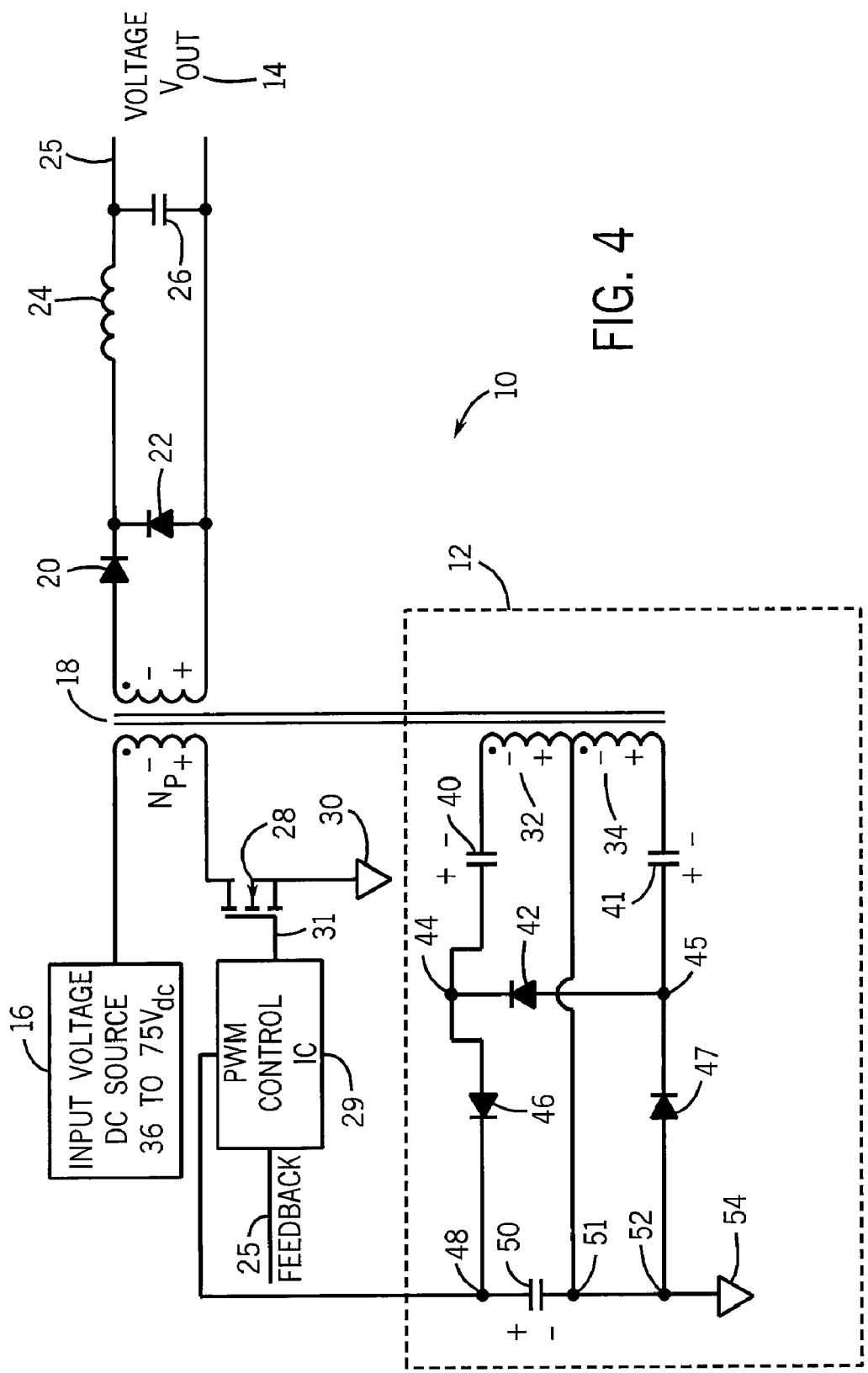

AC COUPLED BIAS CIRCUIT FOR POWER CONVERTERS

FIELD OF THE INVENTION

The present invention relates in general to isolated power supplies and, more particularly, to an AC coupled bias circuit for isolated power supplies.

BACKGROUND OF THE INVENTION

Most modern electronic equipment requires a power supply to provide a direct current (DC) operating potential to the electronic components contained therein. Common types of electronic equipment which use power supplies include personal computers, energy systems, telecommunication systems, audio-video equipment, consumer electronics, automotive components, and other devices which utilize integrated circuits, semiconductor chips, or otherwise require DC operating potential. Most, if not all, semiconductor components require a low voltage DC operating potential. However, many sources of electric power are alternating current (AC), or high voltage DC, which must be converted to low voltage DC for the electronic equipment.

In one common arrangement, the AC/DC power supply receives an AC input voltage, e.g., between 110 and 240 VAC, and converts the AC input voltage to the DC operating voltage. The AC voltage is routed through a full-wave rectifier bridge and filtered to produce a high voltage DC signal. The high voltage DC signal is processed through a pulse width modulated (PWM) controller and transformer assembly to generate the low voltage, regulated DC output voltage, which is used as the operating potential for the semiconductor components and other devices requiring low voltage DC supply in the electronic equipment. The low voltage DC signal is typically in the range of 1 to 12 VDC. In other cases, a DC/DC power supply receives a high voltage DC signal and provides the low voltage DC signal necessary for the electronic equipment.

Power supplies which include a PWM controller use a bias voltage to power the integrated circuit (IC) PWM controller. The bias voltage can be obtained by using a separate, secondary winding as part of the transformer assembly. The bias voltage is obtained from the secondary winding. The bias voltage is then rectified. The bias voltage has a certain degree of variation which depends upon the input voltage supplied to the transformer assembly. A common approach to control the level of the bias voltage is to adjust the turns ratio of the transformer assembly. Commonly, however, a certain degree of variation in the bias circuit remains. Additionally, a particular application may require a fractional turns adjustment, which is often costly and inefficient to implement.

The regulation of the bias circuit voltage usually takes into account an adjustment for input line and output load, which again, results in large variation. Again, regulation by turns ratio adjustment can result in extra cost and lost efficiency. For example, 100-200 mA of current at a 10-12V level may be desired for a particular application. The primary side of the transformer assembly can vary between 36 and 75 volts. In a typical situation, the resulting regulated bias circuit voltage can vary between 10 and 20 volts. Because only 10 volts are desired for the application, the extra 10 volts of headroom or approximately 1 to 2 watts (10V*100 to 200 mA) of power is dissipated as heat.

In addition, adjustment of turns ratios to regulate bias voltages can take up valuable space which could be devoted for other circuit components or to make the footprint of the power supply smaller.

A need exists to supply a relatively constant bias circuit voltage which can be more effectively and efficiently regulated than traditional turns ratio adjustment of transformer assemblies.

SUMMARY OF THE INVENTION

In one embodiment, the present invention is a switching power supply, comprising a transformer including a primary winding having a first terminal receiving an input voltage, a first secondary winding providing an output voltage of the switching power supply, and a second secondary winding, a switching transistor having a conduction path coupled to a second terminal of the primary winding, a pulse width modulated control circuit having a control input coupled to an output of the first secondary winding and an output coupled to a control input of the switching transistor, and a bias circuit for supplying an operating voltage to the pulse width modulated control circuit, the bias circuit including a first capacitor having a first terminal coupled to a first terminal of the second secondary winding, a first diode coupled between a second terminal of the second secondary winding and a second terminal of the first capacitor, and a second diode coupled between the second terminal of the first capacitor and a bias input of the pulse width modulated control circuit. A second capacitor can be connected across the bias input that is connected to the output of the second diode and ground to store charge.

In another embodiment, the present invention is a switching power system for converting an input voltage to an output voltage across a transformer, comprising a control circuit having a control input coupled for receiving the output voltage and having an output coupled to a primary winding of the transformer, and a bias circuit for supplying an operating voltage to the control circuit, the bias circuit including a first capacitor having a first terminal coupled to a first terminal of a first secondary winding of the transformer, a first diode coupled between a second terminal of the first secondary winding and a second terminal of the first capacitor, and a second diode coupled between the second terminal of the first capacitor and a bias input of the control circuit. A second capacitor can be connected across the bias input that is connected to the output of the second diode and ground to store charge.

In another embodiment, the present invention is a bias circuit for supplying an operating voltage to a control circuit of a switching power supply, the switching power supply converting an input voltage to an output voltage across a transformer, comprising a first capacitor having a first terminal coupled to a first terminal of a first secondary winding of the transformer a first diode coupled between a second terminal of the first secondary winding and a second terminal of the first capacitor, and a second diode coupled between the second terminal of the first capacitor and a bias input of the control circuit. A second capacitor can be connected across the bias input that is connected to the output of the second diode and ground to store charge.

In still another embodiment, the present invention is a method of manufacturing a switching power system for converting an input voltage to an output voltage across a transformer, comprising providing a control circuit having a control input coupled for receiving the output voltage and having an output coupled to a primary winding of the transformer, and providing a bias circuit for supplying an operating voltage to the control circuit, the bias circuit including a first capacitor having a first terminal coupled to a first terminal of a first secondary winding of the transformer, a first diode coupled between a second terminal of the first secondary winding and a second terminal of the first capacitor, and a second diode coupled between the second terminal of the first capacitor and a bias input of the control circuit. A second capacitor can be connected across the bias input that is connected to the output of the second diode and ground to store charge.

BRIEF DESCRIPTION OF THE DRAWINGS

FIG. 4 illustrates a second example of a power supply system having a bias circuit;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figures 1, 3:
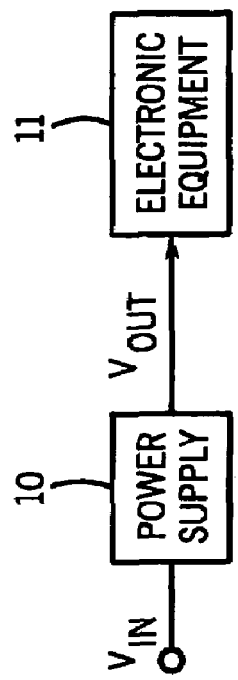
FIG. 1 illustrates a power supply providing DC potential to electronic equipment.
FIG. 3 illustrates a chart of design circuit parameters and realized simulation values for the power supply system of FIG. 2.

Referring to FIG. 1, a power supply 10 is shown providing a DC operating potential to electronic equipment 11. Power supply 10 receives input voltage $V_{IN}$ and produces DC output voltage $V_{OUT}$. The electronic equipment 11 can take the form of personal computers, energy systems, telecommunication systems, audio-video equipment, consumer electronics, automotive components, and other devices which utilize integrated circuits, semiconductor chips, or otherwise require DC operating potential from the power supply.

Figure 2:
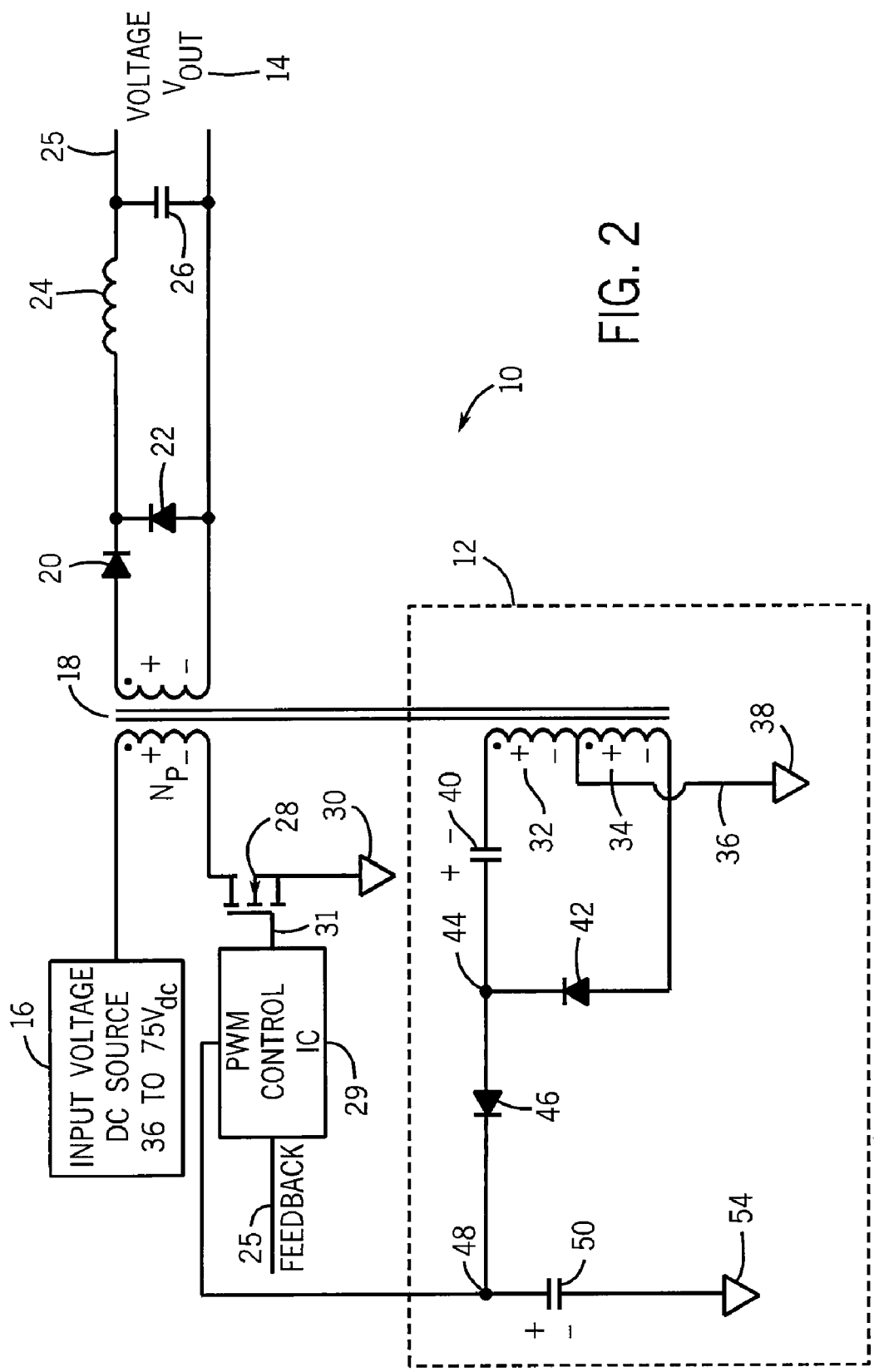
FIG. 2 illustrates an example of a power supply system which includes a bias circuit for providing a bias operating potential to a pulse-width modulation integrated circuit.

Further detail of power supply 10 is shown in FIG. 2. Power supply 10 includes bias circuit 12. The main power output 14 of power supply 10 provides the DC output voltage $V_{OUT}$ to electronic equipment 11. An input voltage 16 or $V_{IN}$ is shown as a DC voltage source 16 which varies from between 36 to 75 DC volts in the depicted example.

Power supply 10 can include a full-wave rectifier bridge which can convert an AC input voltage to a DC input voltage 16. As a result, the input voltage 16 can be an alternating current (AC) signal, e.g., 100 VAC. In the case of a DC input voltage 16, as shown, the full-wave rectifier bridge is omitted.

The DC voltage source 16 is applied to a primary side of transformer 18. A first secondary side of the transformer is coupled to rectifier diodes 20 and 22 to create a DC output voltage 14 of power supply 10 at node 25. Rectifier diodes 20 and 22 can be equivalently replaced by synchronous rectifier MOSFETs without a loss of generality. Capacitor 26 coupled to inductor 24 serve to filter the DC output voltage 14 or main power output 14.

The primary side of transformer 18 is also coupled through power transistor 28 to ground terminal 30. In one example, power transistor 28 is a metal oxide semiconductor field effect transistor (MOSFET). The gate of MOSFET 28 receives a pulse width modulated control signal from a pulse width modulator (PWM) controller integrated circuit (IC) 29, or PWMIC 29 through node 31.

Bias circuit 12 includes two secondary windings 32 and 34 which are coupled together through center tap node 36 to ground terminal 38. The positive terminal of secondary winding 32 is serially coupled to capacitor 40. The negative side of secondary winding 34 is serially coupled to diode 42. Diode 42 and capacitor 40 are connected in parallel to node 44. Diode 46 is serially coupled between nodes 44 and 48. Capacitor 50 is coupled to node 48. Capacitor 50 is coupled to ground terminal 54. Node 48 provides a path for bias voltage to PWMIC 29 to power PWMIC 29. In a separate example, a single secondary winding 32 can be solely used.

In one example, MOSFET 28 is turned on and off at a constant frequency rate (typically 200 kHz to 300 kHz). The on time is commonly referred to as the duty cycle where a duty cycle is equal to the time on/time period. At low input voltages the duty cycle is higher, typically 50 to 65% at low input voltage 16 and decreases as the input voltage 16 increases. In a forward converter, the duty cycle is given in equation (1) as:

$$DC = V_{OUT}/V_{IN} * (N_s/N_p) \quad (1)$$

where:
DC is the duty cycle
$N_p$ is the number of primary turns
$N_s$ is the number of secondary turns
$V_{IN}$ is the input voltage
$V_{OUT}$ is output voltage of the module.

PWMIC 29 sets the conduction time duty cycle of MOSFET 28 to store energy in the primary side of transformer 18 and then transfer the stored energy to the secondary side during the off-time of MOSFET 28. The output voltage 14 is determined by the energy transfer between the primary and secondary side of transformer 18. The energy transfer is regulated by PWMIC 29 via the duty cycle of the PWM control signal to MOSFET 28.

When MOSFET 28 is turned on, the drain of MOSFET 28 is pulled to ground and the voltage at secondary winding 32 is positive while the voltage at secondary winding 34 is negative. When MOSFET 28 is turned off, the voltage on the drain of MOSFET 28 "flies up" to reset the transformer 18. The magnitude of this voltage in an active clamp converter is given in equation (2) as:

$$V_{FLY} = V_{IN}/(1-DC) \quad (2)$$

where:
$V_{FLY}$ is the flyback voltage
DC is the duty cycle
$V_{IN}$ is the input voltage.

In other types of forward converters the reset voltage is similar in that the reset voltage is large enough to preserve the volt-second balance of the transformer. The equations for the peak reset voltage are however, different and depend on the topology employed. Bias circuit 12 utilizes the forward and flyback voltages by averaging the forward and flyback voltages to obtain a semi-regulated control or bias voltage to power the primary side control integrated circuit or PWMIC 29.

Four basic principles are applicable to the operation of power supply 10 and bias circuit 12. (1) At low input voltage 16 to the power supply 10, the transformer forward voltage for the secondary bias windings (e.g., windings 32 or 34) is low, while the flyback or reset voltage on the secondary bias windings is high. (2) At high input voltage 16, the transformer forward voltage for the secondary bias windings (e.g., windings 32 or 34) is high, while the flyback or reset voltage on the secondary bias windings is low. (3) Charge can be stored on a capacitor (e.g, capacitor 40) and then delivered to another capacitor (e.g., capacitor 50) in the bias circuit 12. (4) A capacitor (e.g., capacitor 40) can be used to regulate the amount of voltage delivered from the secondary bias windings (e.g., windings 32 or 34) to another capacitor (e.g., capacitor 50) when the winding voltage is higher than the voltage of the capacitor.

To better explain the operation of bias circuit 12, parameters of the various components of bias circuit 12 can be arbitrarily specified and tested using typical simulation software such as PSpice. In addition to performing simulations of bias circuit 12, actual circuit implementations can be constructed to be used with equal or better effectiveness to demonstrate the operation concepts of bias circuit 12. In one example, the design parameters to be identified include the number of turns for the secondary windings 32 and 34, the desired load on capacitor 50, the capacitance of capacitor 50 and the capacitance of capacitor 40. For simulation example A, the primary side of transformer 18 is assigned a value $N_p$ of 12 turns. The secondary side of transformer 18 is assigned a value $N_s$, of 3 turns. Secondary winding 32 is assigned a value $N_{s1}$ of 3 turns. Secondary winding 34 is assigned a value of $N_{s2}$ of 2 turns. The current load (taken at node 58) for PWMIC 32 is identified to be 30 mA.

FIG. 3 illustrates known and measured parameters from a simulation of bias circuit 12 using the identified values for circuit components previously discussed. Column 60 represents various input voltages 16 that are supplied to transformer 18. Column 62 represents the duty cycle expressed as a percentage, which is obtained using measured values from output 14 and the application of equation (1) above. Again, the duty cycle is seen as a higher percentage at lower input voltages 16. Column 64 represents the forward voltage measured at secondary winding 32 when MOSFET 28 is on. Column 66 represents the forward voltage measured at secondary winding 34 when MOSFET 28 is on. Column 68 represents the flyback voltage taken at secondary winding 32 when MOSFET 28 is off. Column 70 represents flyback voltage taken at secondary winding 34 when MOSFET 28 is off. Column 72 represents the peak voltage obtained by adding the flyback voltage associated with secondary winding 32 in column 68 with the flyback voltage associated with secondary winding 34 in column 70. Finally, column 74 represents the voltage taken across capacitor 50.

Again, bias circuit 12 functions with the assistance of PWMIC 32. PWMIC 32 initially turns on, and power flows through the transformer 18 assembly during the forward cycle. A positive voltage is seen across secondary winding 32 and a negative voltage is seen across secondary winding 34. The positive voltage on secondary winding 32 combines with the built-up charge on capacitor 40. The increased voltage is allowed through forward-biased diode 46, through node 48 and builds up charge on capacitor 50.

Building up positive charge on capacitor 50 continues until the positive voltage from secondary winding 32 is less than the realized voltage on capacitor 50. As the bias circuit goes into a negative or flyback cycle concurrent with the opening of MOSFET 28, capacitor 40 charges up for the next cycle.

In a different operating mode, capacitor 40 then begins to build a reverse charge upon capacitor 40. Diode 42 operates in a conductive state. The buildup of reverse charge on capacitor 40 acts to temper the voltage across capacitor 50 from becoming too high.

The use of capacitor 40 in bias circuit 12, then, can serve two functions: (1) to regulate the voltage on capacitor 50 by storing charge on one cycle and delivering it on another cycle, and (2) to limit the peak voltage on capacitor 50 by preventing too much voltage from secondary winding 32 from appearing on capacitor 50 by acting as a voltage dropping component. The end result is the maintenance of a fairly constant voltage across capacitor 50.

Again, capacitor 40 serves to build up positive charge during positive cycles and negative charge through a negative cycle. The placement of diodes 42 and 46 allow capacitor 40 to build up the positive charge, discharge it upon capacitor 50 and then build up negative charge to temper the potential across capacitor 40. In contrast to certain prior art devices, bias circuit 12 operates through the entire duty cycle (positive and negative cycles) to ensure a constant charge is deposited upon capacitor 50.

Values for capacitor 40 can be selected from a wide range, from a few picofarads to over a microfarad to serve the applications required by the telecommunications industry, in one example. Because the values of capacitors 40 and 50 can be precisely selected from a wide range, the range of adjustment of bias voltage is large and can be specifically tailored for a specific application without the need for a redesign of a layout which could include fractional turns adjustments in secondary windings 32 or 34.

To increase the flexibility and ease of adjustment, and to provide additional regulation capability, additional capacitors can be included in bias circuit 12. Turning to FIG. 4, a power supply 10 is shown including a bias circuit 12 having a second additional capacitor 41 and diode 47. Power supply 10 includes input voltage 16 coupled to the primary side of transformer 18. The secondary side of transformer 18 is again serially coupled to diode 20, and coupled in parallel to diode 22 to rectify the power. Again, inductor 24 and capacitor 26 serve to filter the power output 14 received through node 25.

The primary side of transformer 18 is coupled through MOSFET 28 to ground terminal 30. Again, the gate of MOSFET 28 is coupled through node 31 to PWMIC 29. Bias circuit 12 includes secondary windings 32 and 34 which are serially coupled to capacitors 40 and 41. The center tap of connected secondary windings 32 and 34 is coupled to node 51. Diode 42 is shown serially coupled between nodes 44 and 45. Diode 46 is shown serially coupled between nodes 44 and 48. Diode 47 is shown serially coupled between nodes 52 and 45. Again, capacitor 50 is connected in parallel between nodes 48 and 52. PWMIC 29 is connected to bias circuit 12 through node 58.

Bias circuit 12 as shown in FIG. 4, like the bias circuit shown in FIG. 2, also works on both positive and negative (forward and flyback) cycles of a full duty cycle to deposit a relatively constant charge upon capacitor 50. Capacitor 41 and capacitor 40 store charge, deliver charge to each other, deliver charge to capacitor 50 and to the load through node 58. Diode 47 must be placed between nodes 52 and 45 to allow capacitors 40 and 41 to charge and discharge in each cycle and function as a valid impedance. A typical operation of bias circuit 12 as depicted in FIG. 4 can begin with the flyback cycle of power supply 10. Again, in the flyback cycle, the voltage on the drain of MOSFET 28 "flies up" to reset the transformer 18. Capacitors 40 and 41 are typically charging as a capacitive divider. A voltage is developed across capacitors 40 and 41.

In the alternative, if the turns ratio of secondary winding 34 along with the flyback voltage is high enough, energy can be delivered to capacitor 50 such that the flyback cycle becomes a charge cycle for capacitor 50. Depending on selection of input voltage 16 and circuit parameters such as the number of secondary turns for secondary windings 32 and 34, the capacitances of capacitors 40 and 41, one of at least two charging paths can be realized during the flyback cycle. In the example shown in FIG. 4, current can flow from the positive terminals of secondary windings 32 and 34 to the negative terminal of capacitor 41, through node 45 and through diode 42, through node 44 and to the positive terminal of capacitor 40, and to the negative terminal of secondary winding 32.

In the situation of reversed voltage of secondary windings 32 and 34, current can flow from the center tap of secondary windings 32 and 34 through node 51, through diode 47, to the positive terminal of capacitor 41 and to the negative terminal of secondary winding 34. Additionally, current can flow from the positive terminal of secondary winding 32 through the negative terminal of capacitor 40, through node 44 and diode 46 to node 48, through capacitor 50 and returning through center tap node 51 to the negative terminal of secondary winding 32.

In the forward or positive cycle, different charging and discharge paths can also be realized. Because the voltage across secondary winding 32 goes positive at the start of the forward cycle, charge which has been stored on capacitor 40 can be delivered to capacitor 50. Additionally, capacitor 41 can be charged to the voltage of secondary winding 34. In some cases, the voltage on capacitor 40 and the voltage on secondary winding 32 can be insufficient to charge capacitor 50, resulting in no current flow.

Regardless of which charging and discharging paths are realized during the operation of a forward and flyback cycle, the placement of capacitors 40 and 41 in combination with diodes 42, 46 and 47 work to ensure that capacitor 50 remains consistently charged to a desired voltage. Again, circuit parameters such as the capacitances of capacitors 40 and 41 can be adjusted to realize appropriate regulation in a given situation, and can alleviate the need for fractional turns adjustment of secondary windings 32 or 34.

Figure 5:
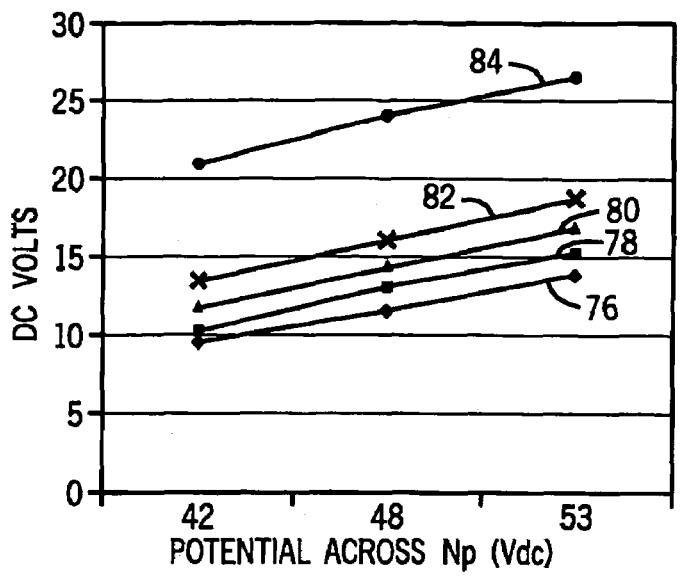
FIG. 5 illustrates a graph of varying curves representing example bias voltages taken across a capacitor of the bias circuit using different values of capacitance for a second capacitor of the bias circuit.

Turning to FIG. 5, example voltages taken across capacitor 50 using different values of capacitor 41 are shown. The values depicted in FIG. 5 are obtained from measurements made with a single winding charge pump circuit, as opposed to the dual winding examples shown in FIGS. 2 and 4. The capacitance value of capacitor 40 is fixed at 33 nF. The capacitance value of capacitor 50 is also fixed at 1 uF. The Y-axis shows the potential across capacitor 50, which range from 0 to 30 Vdc. The X-axis shows a range of potential which is applied to the primary side of transformer 18, ranging from 42 to 53 Vdc. Line 74 represents a capacitor 41 with capacitance value 33 nF. Line 78 represents a capacitance value of 47 nF. Line 80 represents a capacitance value of 100 nF. Line 82 represents a simulation where capacitor 41 is removed, or short-circuited. Finally, line 84 represents a simulation where the circuit is reconfigured as a voltage doubler yielding double the voltage. The generated voltage as shown in FIG. 5 can be significantly controlled by appropriately choosing values of capacitance for capacitors 40, 41 and 50.

Figure 6:
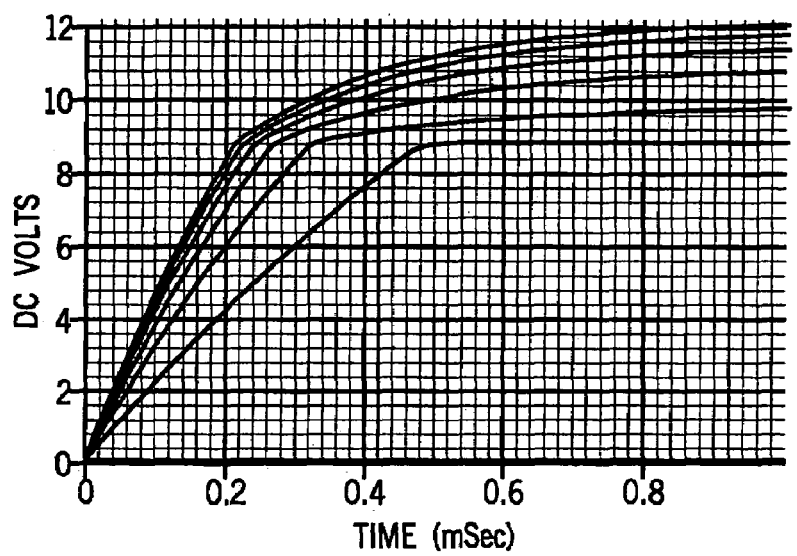
FIG. 6 illustrates the varying voltage curves resulting from a parametric variation of a capacitor in the bias circuit from zero to 50 nF shown small time increments.

Turning to FIG. 6, the results of a parametric variation of capacitor 41 from zero to 50 nF is shown in displayed small time steps. As shown, the realized voltage progressively increases as the value of capacitor 41 increases from zero to 50 nF. Additional charge is coupled onto capacitor 50 as a result of the increased capacitance of capacitor 41.

Bias circuit 12 as depicted in FIG. 4 can include additional modifications which are designed to enhance the flexibility of bias voltage regulation of the circuit 12 and provide a consistently regulated voltage across the load. An additional capacitor can be placed in the center-tap return path at node 51 to provide an additional parameter adjustment for the circuit 12. In addition, diode 47 could be used as a Zener diode (with a resistor to limit current) to clamp the voltage across capacitor 50.

Figure 7:
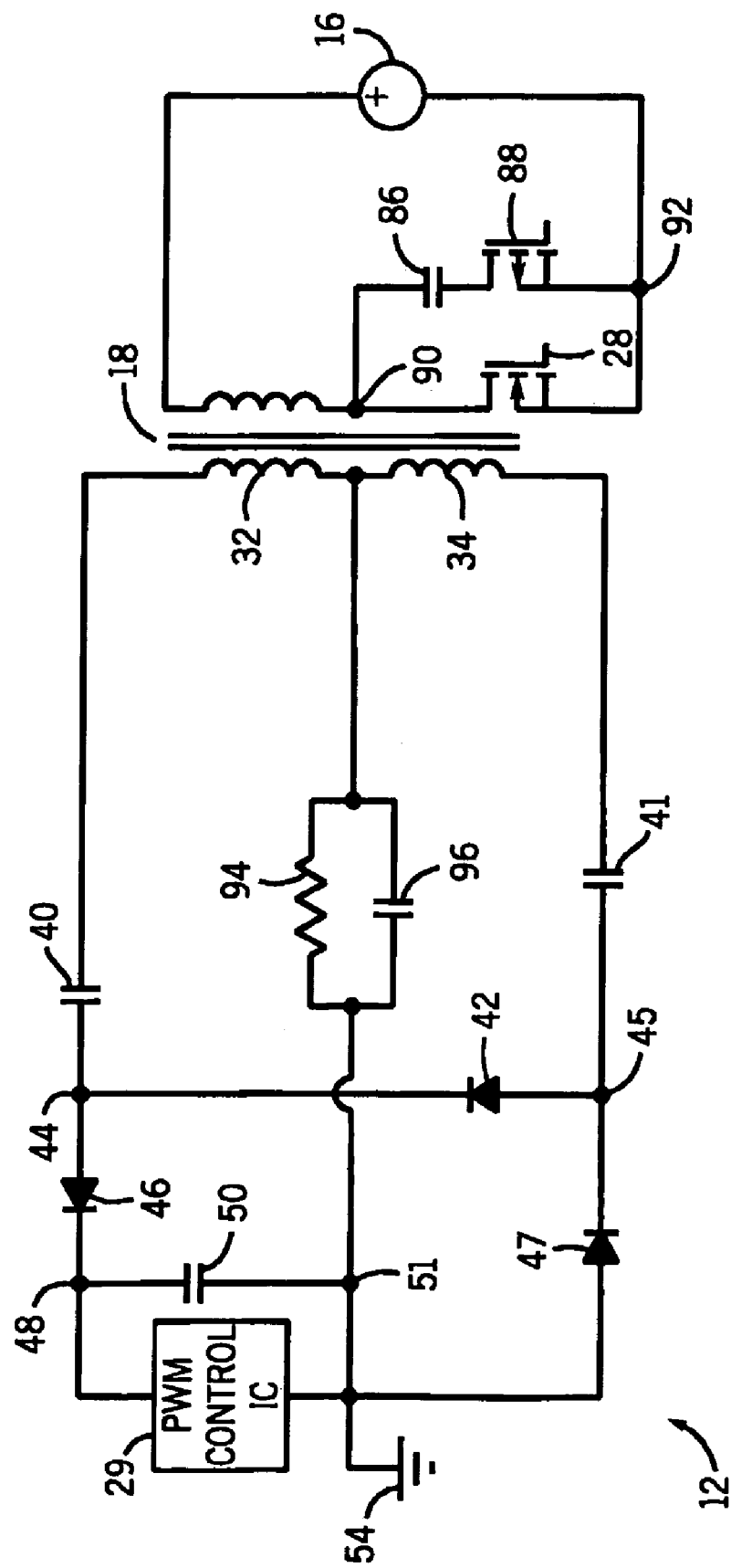
FIG. 7 illustrates the power supply system of FIG. 2 in a separate embodiment including an additional capacitor and active clamp regulator circuit.

FIG. 7 illustrates a simulated bias circuit 12 as part of an overall power supply 10 using an active clamp regulator circuit. A second MOSFET 88 or other switching element is coupled to clamping capacitor 86 between nodes 90 and 92 located between input voltage 16 and the primary winding of transformer 18. PWMIC 29 or a similar load is shown coupled in parallel with nodes 48 and 51. PWMIC 29 is coupled to ground 54 through node 51. In addition, a third capacitor 96 is added, coupled in parallel with resistor 94 between node 51 and the center tap of interconnected secondary windings 32 and 34. Resistor 94 is provided as a 1 megaohm resister for the simulation to converge, and is not implemented in an actual circuit. Other than the addition of the third regulating capacitor 96 and the active clamp regulator circuit, bias circuit 12 as shown in FIG. 7 shares the same design characteristics as the bias circuit depicted in FIG. 4, earlier. The addition of the active clamp regulator circuit is intended to provide additional voltage regulation. Clamping capacitor 86 is adapted for storing leakage energy from the primary side of transformer 18. The implementation of bias circuit 12 with the addition of a third regulating capacitor 96 and the active clamp regulator circuit can result in an additional reduction in the variation of voltage seen across capacitor 50 and thereby, the load.

Figure 8:
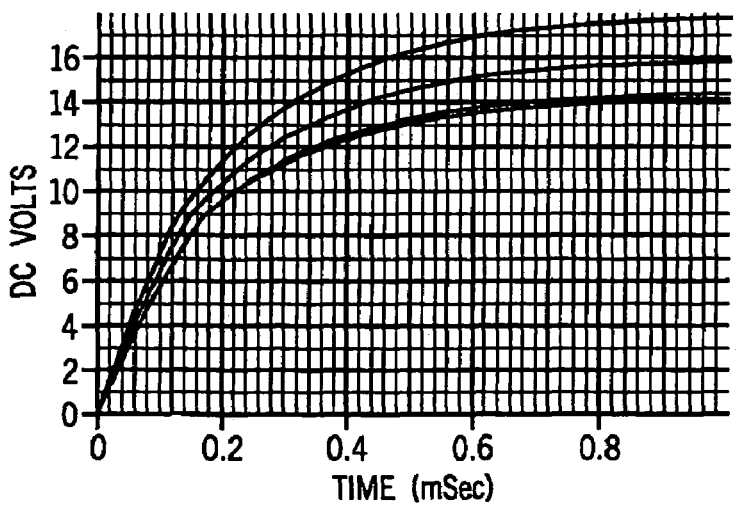
FIG. 8 illustrates a set of curves representing various bias voltages using an active clamp regulator circuit as part of the power supply system of FIG. 2.

FIG. 8 shows the result of implementing and simulating the bias circuit 12 depicted in FIG. 7 as a graph of varying input voltages 16. The shown input voltages 16 vary between 36 to 72 Vdc. Each of the four curves shown represent (from lowest to highest on the Y-axis) 36, 48, 60 and 72 Vdc as a function of the voltage seen across capacitor 50. The X-axis represents a series of small time steps. As shown, for an approximate 200% variation in input voltage, the variation in voltage seen across capacitor 50 is less than 30%.

While one or more embodiments of the present invention have been illustrated in detail, the skilled artisan will appreciate that modifications and adaptations to those embodiments may be made without departing from the scope of the present invention as set forth in the following claims.

What is claimed is:

1. A switching power supply, comprising:
a transformer including a primary winding having a first terminal receiving an input voltage, a first secondary winding providing an output voltage of the switching power supply, and a second secondary winding having a center tap connected to a ground terminal;

a switching transistor having a conduction path coupled to a second terminal of the primary winding;

a pulse width modulated control circuit having a control input coupled for receiving the output voltage of the switching power supply and an output coupled to a control input of the switching transistor; and a bias circuit having an output for supplying an operating voltage to the pulse width modulated control circuit, the bias circuit consisting of:

(a) a first capacitor having a first terminal coupled to a first terminal of the second secondary winding, (b) a second capacitor having a first terminal coupled to a second terminal of the second secondary winding, the first and second terminals of the second secondary winding being on opposite ends of the winding with the center tap between the first and second terminals of the second secondary winding, (c) a first diode having a cathode coupled to a second terminal of the first capacitor at a first node and an anode coupled to a second terminal of the second capacitor at a second node, (d) a second diode having an anode coupled to the first node and a cathode coupled to the output of the bias circuit, (e) a third diode having a cathode coupled to the second node and an anode coupled to the ground terminal, and (f) a third capacitor having a first terminal coupled to the output of the bias circuit and a second terminal coupled to the ground terminal.

* * * * *